United States Patent
Kung et al.

(10) Patent No.: US 8,063,622 B2
(45) Date of Patent: Nov. 22, 2011

(54) METHOD AND APPARATUS FOR IMPLEMENTING SLEW RATE CONTROL USING BYPASS CAPACITOR

(75) Inventors: David Kung, Hillsborough, CA (US); Leif Lund, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 21 days.

(21) Appl. No.: 12/572,952

(22) Filed: Oct. 2, 2009

(65) Prior Publication Data
US 2011/0080209 A1 Apr. 7, 2011

(51) Int. Cl.
G05F 1/00 (2006.01)
G05F 1/10 (2006.01)
(52) U.S. Cl. .................................... 323/288; 327/540
(58) Field of Classification Search .................. 323/288
See application file for complete search history.

(56) References Cited

U.S. PATENT DOCUMENTS

| | | | | |
|---|---|---|---|---|
| 5,939,870 | A * | 8/1999 | Nguyen et al. | 323/282 |
| 6,104,221 | A * | 8/2000 | Hoon | 327/143 |
| 6,531,856 | B2 * | 3/2003 | Sakiyama et al. | 323/288 |
| 6,608,520 | B1 * | 8/2003 | Miyazaki | 327/540 |
| 6,654,263 | B2 * | 11/2003 | Kurotsu | 363/60 |
| 6,806,729 | B2 * | 10/2004 | Wallace et al. | 326/33 |
| 6,909,264 | B2 * | 6/2005 | Del Gatto et al. | 323/268 |
| 7,093,167 | B2 * | 8/2006 | Komiya | 714/44 |
| 7,122,996 | B1 * | 10/2006 | Huang | 323/288 |
| 7,166,991 | B2 * | 1/2007 | Eberlein | 323/280 |
| 7,564,274 | B2 * | 7/2009 | Hughes | 327/108 |
| 7,710,084 | B1 * | 5/2010 | Guo | 323/224 |
| 7,733,164 | B2 * | 6/2010 | Umamichi et al. | 327/551 |
| 7,821,244 | B1 * | 10/2010 | Signoretti et al. | 323/288 |
| 2002/0070721 | A1 * | 6/2002 | Ostrom | 323/284 |
| 2004/0183613 | A1 * | 9/2004 | Kurd et al. | 331/186 |
| 2008/0218223 | A1 * | 9/2008 | Kimura | 327/142 |
| 2008/0283876 | A1 * | 11/2008 | Souda | 257/254 |
| 2009/0103337 | A1 | 4/2009 | Matthews | |
| 2010/0039099 | A1 * | 2/2010 | Kim et al. | 324/120 |
| 2010/0264890 | A1 * | 10/2010 | Caldwell | 323/282 |

* cited by examiner

*Primary Examiner* — Thomas J Hiltunen
(74) *Attorney, Agent, or Firm* — Blakely Sokoloff Taylor & Zafman LLP

(57) ABSTRACT

A circuit to control the slew rate of charging a capacitance using the capacitance is disclosed. An example circuit includes a regulator circuit to regulate a supply voltage during a normal operation mode of the circuit. A capacitance circuit is coupled to the regulator circuit. The regulator circuit is coupled to charge a capacitance between a first node and a second node of the capacitance circuit with a charge current. A slew rate control circuit is coupled to the regulator circuit and the capacitance circuit. The slew rate control circuit sets a slew rate of a voltage between the first and second nodes during a power up mode of the circuit.

16 Claims, 3 Drawing Sheets

METHOD AND APPARATUS FOR IMPLEMENTING SLEW RATE CONTROL USING BYPASS CAPACITOR

BACKGROUND INFORMATION

1. Field of the Disclosure

The present invention relates generally to circuits in which a capacitive element is charged. More specifically, the present invention relates to charging of a capacitive circuit during a power-up condition.

2. Background

Power systems may be used for a multitude of purposes and applications. Power converters are typically electrical circuits that are coupled to a source of electrical energy, which applies a voltage across the input terminals of the power converter. Electrical circuits often require an initialization period in which a power source (e.g. a capacitor) is able to power up the circuitry after an input voltage is initially applied across the input terminals. A challenge for circuit designers is to gradually activate the power source, sometimes a supply capacitor, in the same manner over a wide range of input voltage conditions. For instance, without the ability to control the charging of a supply capacitor, which supplies power to the rest of the circuit at power up, some circuits may experience race conditions or other similar types of issues in which unknown or unwanted results may occur for circuit elements. In addition, if instantaneous input voltage is too high an overshoot condition may occur, in which case the supply capacitor is over charged due to the fast rate of charge of the supply capacitor and the slow response time of the circuit. This can cause other circuit elements to be exposed to high voltages that may be beyond their voltage rating.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for implementing slew rate control of a capacitor element are described. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, an example slew rate control circuit in accordance with the teachings of the present invention sets the slew rate of a voltage across an integrated supply capacitor during power up mode in a high impedance integrated circuit using a portion of the capacitance of the supply capacitor. The control of the slew rate allows all internal nodes of the high impedance integrated circuit to power up in a controlled manner, which helps to avoid race conditions.

In one example, a slew rate control circuit in accordance with the teachings of the present invention may be used as part of an integrated circuit that is connected directly to an ac line voltage of, for example, 85 Vac to 265 Vac and will be exposed to high voltage instantly when ac power is applied. In one example, the slew rate control circuit can accommodate dc voltages that may be present on the ac line at the time of turn on so the dc voltage at a given time can be anywhere between 0 and 375 volts when power up is initiated.

Figure 1:
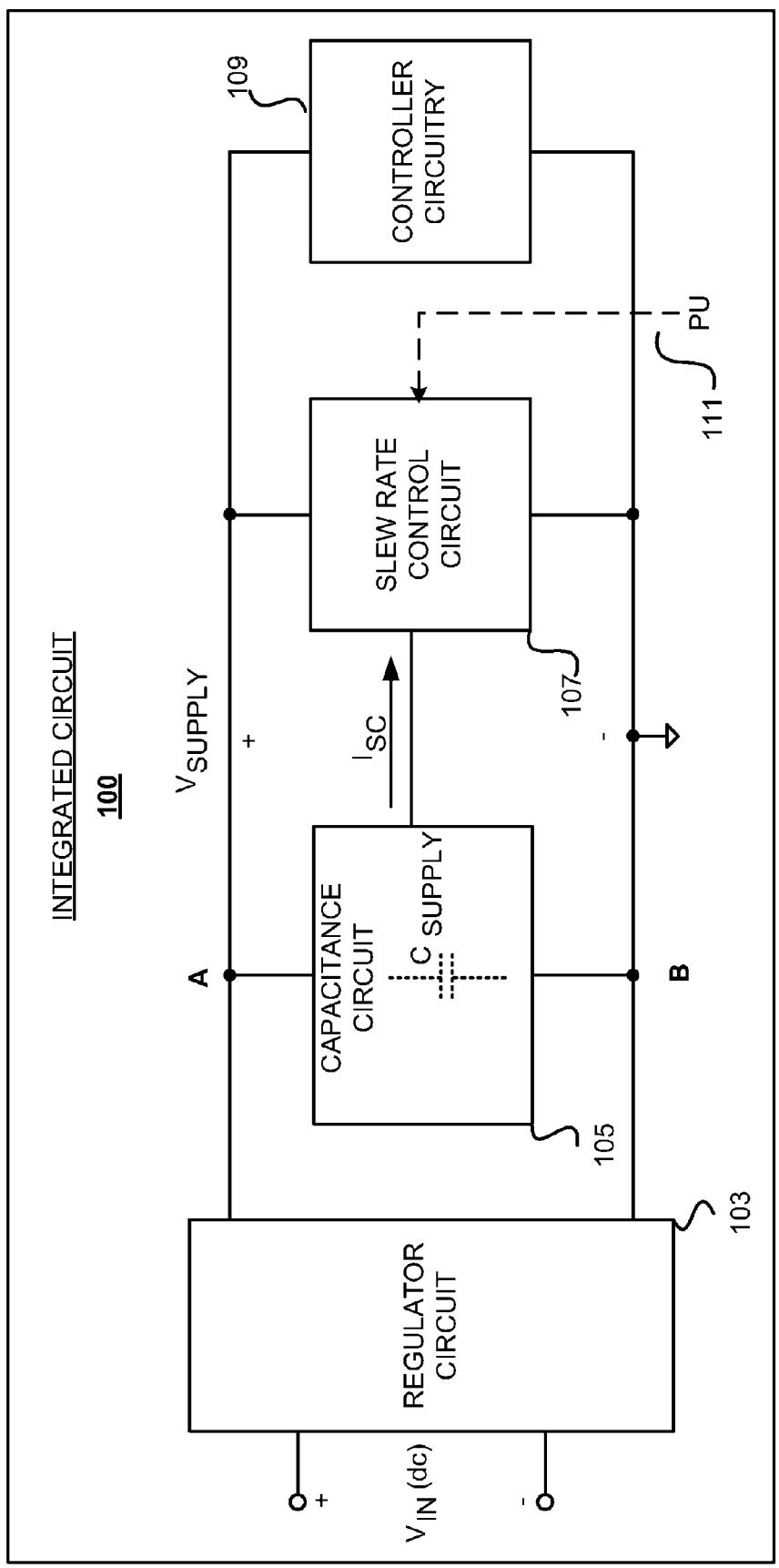
FIG. 1 is a block diagram illustrating generally an example circuit in which the slew rate of a voltage across a capacitance circuit being charged during power up is set in accordance with the teachings of the present invention.

To illustrate, FIG. 1 is a block diagram illustrating generally an example integrated circuit 100 in which the slew rate of a voltage across a capacitance circuit being charged is set by controlling a rate of change of voltage across a portion of the capacitance of a capacitance circuit 105 in accordance with the teachings of the present invention. As shown in the depicted example, an integrated circuit 100 includes a regulator circuit 103, which is coupled to regulate a supply voltage $V_{SUPPLY}$ across capacitance circuit 105 during a normal operation mode of circuit 100. In the example, regulator circuit 103 is coupled to receive the input voltage $V_{IN}$, which in one example is a rectified dc line voltage. During operation, the regulator circuit 103 is coupled to charge a capacitance $C_{SUPPLY}$ between a first node A and a second node B of the capacitance circuit 105. As shown, a slew rate control circuit 107 is also coupled to regulator circuit 103 and capacitance circuit 105. During operation, the slew rate control circuit 107 is coupled to set a slew rate (the change in voltage over change in time) of the supply voltage $V_{SUPPLY}$ between the first and second nodes of the capacitance circuit 105 during a power up mode of circuit 100. In power up mode, slew rate control circuit 107 receives a slew rate control current $I_{SC}$ from capacitance circuit 105. In particular, slew rate control circuit 107 limits the slew rate control current $I_{SC}$ to control the slew rate across capacitance circuit 105.

As will be discussed in greater detail below, one example of slew rate control circuit 107 sets the slew rate of supply voltage $V_{SUPPLY}$ across capacitance circuit 105 between the first node A and second node B only during the power up mode of circuit 100. The slew rate is the rate of change of the voltage across capacitance circuit 105. The setting of the slew rate by slew rate control circuit 107 helps to ensure that the rest of the circuitry on integrated circuit 100 will start-up in a controlled manner without any race conditions in accordance with the teachings of the present invention. After the power up mode is complete, regulator circuit 103 regulates the supply voltage $V_{SUPPLY}$ only during normal operation mode of circuit 100. As shown in the depicted example, a power up signal PU 111 is coupled to be received by the slew rate control circuit 107 to indicate the power up mode of circuit 100.

In one example, supply voltage $V_{SUPPLY}$ that is regulated by regulator circuit 103 during normal operation mode is coupled to power other circuitry that is included in integrated circuit 100. As shown in FIG. 1, the other circuitry in integrated circuit 100 may include for example controller circuitry 109, which is coupled to supply voltage $V_{SUPPLY}$ to receive operating power. It is appreciated that controller circuitry 109 is shown in FIG. 1 for explanation purposes and that other types of circuitry that are powered by $V_{SUPPLY}$ during normal operation mode may be included in integrated circuit 100 in accordance with the teachings of the present invention.

Figure 2:
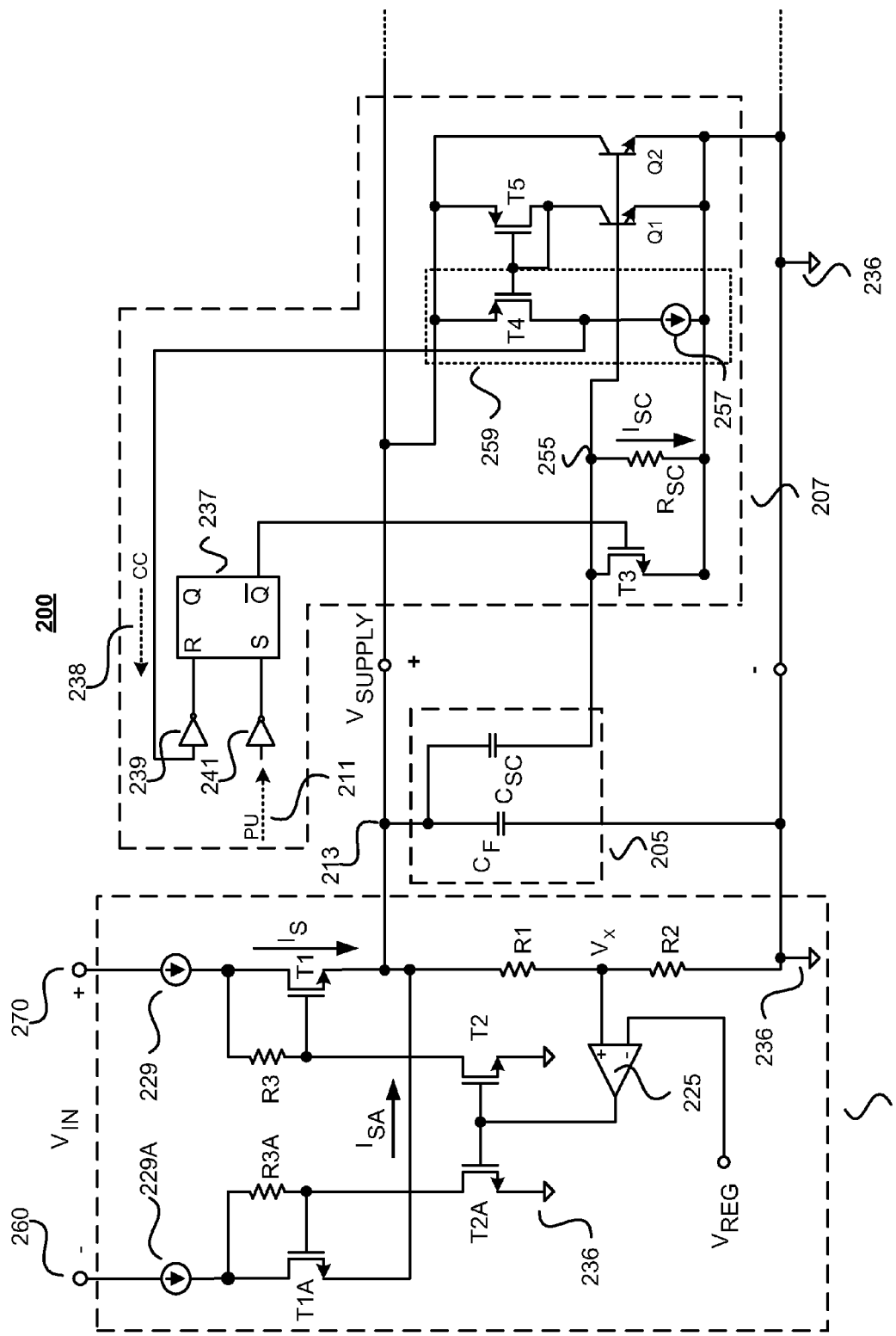
FIG. 2 is a schematic illustrating generally an example circuit in which the slew rate of the voltage across the capacitance circuit being charged during power up is set using a portion of the capacitance in accordance with the teachings of the present invention.

FIG. 2 is a schematic illustrating generally an example circuit 200 in which the slew rate of a voltage $V_{SUPPLY}$ across a capacitance circuit 205 being charged is controlled during power up mode using a portion of the capacitance in capacitance circuit 205 in accordance with the teachings of the present invention. In one example, regulator 203, capacitance circuit 205, and slew rate controller 207 are all example implementations of regulator 103, capacitance circuit 105, and slew rate controller 107, respectively, of integrated circuit 100 of FIG. 1 in accordance with the teachings of the present invention. As shown in the depicted example, circuit 200 includes a regulator circuit 203, which is coupled to regulate a supply voltage $V_{SUPPLY}$ across a capacitance circuit 205 during normal operation. During operation, the regulator circuit 203 is coupled to charge capacitance circuit 205 between a first node 213 and a second node 236 with a supply current $I_S$. As shown, a slew rate control circuit 207 is coupled to the regulator circuit 203 and the capacitance circuit 205.

In one example, integrated circuit 200 may be included in a low power integrated circuit and slew rate control circuit 207 is used to control the slew rate (dv/dt) of a supply voltage, $V_{SUPPLY}$ in the illustrated example, until it has reached a regulation threshold value $V_{REF}$. During operation, the slew rate control circuit 207 is coupled to set the slew rate of supply voltage $V_{SUPPLY}$ between the first and second nodes 213 and 236 during a power up mode of circuit 200.

As shown in FIG. 2, capacitance circuit 205 includes a first electrical element coupled to a second electrical element. In the depicted example, the first and second electrical elements are illustrated as capacitor $C_F$ coupled to capacitor $C_{SC}$. Capacitor $C_F$ has a first capacitance and capacitor $C_{SC}$ has a second capacitance. In one example, the capacitance of the capacitance circuit 205 is equal to the capacitance of capacitor $C_F$ during the power up mode. However, the capacitance of the capacitance circuit 205 is equal to a sum of the capacitance of capacitor $C_F$ and the capacitance of capacitor $C_{SC}$ during the normal operation mode. Thus, the overall capacitance of the capacitance circuit 205 is greater during normal operating mode than the overall capacitance of the capacitance circuit 205 during power up mode.

In one example, capacitors $C_F$ and $C_{SC}$ are both integrated on the silicon of integrated circuit in which circuit 200 is included and are chosen to keep the area of capacitance circuit 205 down while at the same time maintaining a low ripple of the supply voltage $V_{SUPPLY}$ (e.g. 0.5 Volts peak-to-peak) during normal operation mode. In one example, the overall capacitance of capacitance circuit 205 is approximately 200 pF, where capacitor $C_F$ is a 125 pF and capacitor $C_{SC}$ is 75 pF. In one example, the current consumption of the entire integrated circuit in which circuit 200 is included is in the range of 15 to 20 uA.

As shown in the depicted example, slew rate control circuit 207 includes a switch T3 and a resistor $R_{SC}$ that are coupled to capacitance circuit 205. Switch T3 is switched off by slew rate control circuit 207 during power up mode, when supply voltage $V_{SUPPLY}$ is less than a regulation voltage, and switch T3 is switched on by slew rate control circuit 207 when supply voltage exceeds a regulation voltage. In operation switch T3 continues to stay on during normal operation mode in accordance with the teachings of the present invention. As a result, the slew rate control circuit 207 is coupled to utilize a portion of the capacitance from capacitance circuit 205 during the power up mode. In particular, the portion of the capacitance that is utilized or borrowed from capacitance circuit 205 is the capacitance of capacitor $C_{SC}$ as a result of switch T3 being switched off. As shown, when switch T3 is switched off, meaning T3 is unable to conduct current, a first node of capacitor $C_{SC}$ that was coupled to node 236 substantially through switch T3 is now coupled to node 236 substantially through resistor $R_{SC}$. However, slew rate control circuit 207 discontinues utilizing this portion of capacitance from the capacitance circuit 205 during normal operation mode. In particular, slew rate control circuit 207 discontinues utilizing or borrowing capacitor $C_{SC}$ from capacitance circuit 205 in response to the supply voltage $V_{SUPPLY}$ across capacitance circuit 205 between the first and second nodes 213 and 236 reaching a regulation threshold voltage. In one example, the regulation threshold voltage is a predetermined voltage of approximately 5.6 volts. Thus, in one example, switch T3 is switched by slew rate control circuit 207 in response to the supply voltage $V_{SUPPLY}$ in accordance with the teachings of the present invention.

As shown in FIG. 2, slew rate control circuit 207 also includes a latch 237 that is coupled to receive a power up signal PU 211. In one example, latch 237 is a set-reset SR latch and latch 237 is set in response to PU signal through an inverter 241 as shown. In the example, during the ramp-up of the supply voltage $V_{SUPPLY}$ at power up, PU signal will start "low" setting the latch 237 through inverter 241, which forces switch T3 to stay off. When switch T3 is off, capacitor $C_{SC}$ is utilized by slew rate control circuit 207 and is, in effect, borrowed from capacitance circuit 205.

As shown in the depicted example, with switch T3 switched off, capacitor $C_{SC}$ and resistor $R_{SC}$ are in series such that a portion of supply current $I_S$, which is slew rate control current $I_{SC}$ flows through capacitor $C_{SC}$ and resistor $R_{SC}$. In one example, resistor $R_{SC}$ has a resistance of approximately 750 Kohms and capacitor $C_{SC}$ has a capacitance of approximately 75 pF. As shown in the depicted example, the base terminals of bipolar transistors Q1 and Q2 are coupled to resistor $R_{SC}$. Thus, the voltage drop across resistor $R_{SC}$ while resistor $R_{SC}$ and bipolar transistors Q1 and Q2 conduct current is limited to a $V_{BE}$ base-emitter voltage drop of bipolar transistors Q1 and Q2, which is equal to a diode drop or approximately 0.7 Volts. Thus, by selecting the resistance of resistor $R_{SC}$, the current through resistor $R_{SC}$ is set according to Ohm's law, which in this example is approximately 0.7 Volts divided by the resistance of resistor $R_{SC}$. By setting slew rate control current $I_{SC}$ through the resistor $R_{SC}$ and capacitor $C_{SC}$, the slew rate of charging capacitance circuit 205 during the power up mode is set in accordance with the teachings of the present invention.

Since the voltage at a node 255 is set by a base to emitter voltage drop of bipolar junction transistor (BJT) Q2, charge current $I_{SC}$ can be set by setting value of resistor $R_{SC}$. Since capacitor $C_{SC}$ is governed by the following equation:

$$\frac{dv}{dt} = \frac{I_{SC}}{C_{SC}}$$

where dv/dt is the slew rate or rate at which the voltage increases across capacitance circuit 205, $I_{SC}$ is the slew rate control current that charges capacitor $C_{SC}$, and $C_{SC}$ is the capacitance value of the capacitor $C_{SC}$. As shown, one variable to limit and/or lower dv/dt is the slew rate control current $I_{SC}$ charging the capacitor $C_{SC}$. In one example, capacitor $C_{SC}$ and resistor $R_{SC}$ are utilized by slew rate control circuit 207 to generate a slew rate limited ramp-up of the supply voltage $V_{SUPPLY}$ across capacitance circuit 205 during power up mode.

The following description of the example illustrated in FIG. 2 applies when input voltage terminal 270 is more positive than input voltage terminal 260, as indicated by the polarity symbols at terminals 270 and 260. When the input voltage has the opposite polarity, such that terminal 260 is more positive than input voltage terminal 270, current source 229A is substituted for current source 229, resistor R3A is substituted for resistor R3, switch T1A is substituted for switch T1, switch T2A is substituted for switch T2, and supply current $I_{SA}$ is substituted for supply current $I_S$ in the following description.

In the illustrated example, regulator circuit 203 includes a switch T1 coupled to be switched on and off to provide supply current $I_S$ from current source 229, which is coupled to the input voltage $V_{IN}$ as shown. In one example, $V_{IN}$ during power up mode can be an instantaneous dc voltage and current source 229 provides supply current $I_S$ of approximately 0.2 to 0.5 mA. In one example, current source 229 may vary in response to input voltage $V_{IN}$. When switch T1 is switched on, supply current $I_S$ from current source 229 is coupled to be received by the capacitance circuit 205 and controlled by slew rate control circuit 207 through node 213 as shown. When circuit 200 is initially turned on during the power up mode, switch T1 is switched on during the power up mode, which enables the supply current $I_S$ from current source 229 to begin charging capacitance circuit 205 to ramp-up the supply voltage $V_{SUPPLY}$.

In one example, regulator circuit 203 also includes a comparator 225, which is coupled to receive a voltage $V_X$ representative of the supply voltage $V_{SUPPLY}$ through a resistor divider formed with resistors R1 and R2. As shown in the depicted example, comparator 225 is coupled to compare the received voltage representative of the supply voltage $V_{SUPPLY}$ with a reference voltage $V_{REG}$. In the example, reference voltage $V_{REG}$ corresponds to the supply voltage $V_{SUPPLY}$ being equal to the regulation threshold voltage $V_{REF}$, such as for example approximately 5.6 volts.

When circuit 200 is initially powered up, comparator 225 senses that the supply voltage $V_{SUPPLY}$ is less than the regulation threshold voltage, which results in comparator 225 causing switch T2 to be switched off. When switch T2 is switched off, the gate of switch T1 is pulled high through resistor R3 to turn on switch T1. When switch T1 is switched on, supply current $I_S$ from current source 229 charges the capacitance circuit 205 through a node 213 as shown. In addition, to control slew rate across capacitance circuit 205, transistors Q1 and Q2 shunt excess current from current source 229 to ground 236. In other words, the excess current from current source 229 that is not used to charge capacitor $C_{SC}$ is directed to ground 236 through transistors Q1 and Q2.

When comparator 225 senses that the supply voltage $V_{SUPPLY}$ has reached the regulation threshold voltage, comparator 225 is coupled to turn switch T2 on. When switch T2 is switched on, the gate of switch T1 is pulled low, which turns off switch T1. When switch T1 is switched off, supply current $I_S$ from current source 229 is no longer received by the capacitance circuit 205 at node 213. In this manner, regulator circuit 203 provides regulation of supply voltage $V_{SUPPLY}$ during a normal mode of operation.

In the example illustrated in FIG. 2, slew rate control circuit includes a current mirror formed with transistors T4 and T5. Bipolar transistor Q1 is coupled to transistor T5. As shown in the example, bipolar transistor Q2 is coupled across transistors T5 and Q1, with the bases of bipolar transistors Q1 and Q2 coupled to resistor $R_{SC}$ as described previously. In the example, a current comparator 259 is formed with a current source 257 coupled to transistor T4.

As described above, when the supply voltage $V_{SUPPLY}$ has reached the regulation threshold voltage $V_{REF}$, switch T1 is switched off such that the charge current from current source 229 is no longer received at node 213. As a result, bipolar transistors Q1 and Q2 stop conducting current. At this point, a current comparator output signal CC 238 of the current comparator 259 will then become low, which indicates that the slew rate control circuit 207 is no longer active. Latch 237 is then reset by the low current comparator output signal CC 238 through inverter 239, which allows transistor T3 to be switched on. When transistor T3 is switched on, slew rate control circuit 207 discontinues utilizing or borrowing capacitor $C_{SC}$ and the capacitance of capacitor $C_{SC}$ is therefore returned to capacitance circuit 205 in accordance with the teachings of the present invention. With transistor T3 switched on and slew rate control circuit 207 deactivated, the overall capacitance of capacitance circuit 205 is now the sum of capacitor $C_F$ and capacitor $C_{SC}$. Furthermore, with transistor T3 switched on integrated circuit 200 is switched from operation in a power up mode to a normal mode in which voltage supply $V_{SUPPLY}$ is now regulated.

It is appreciated that by using the capacitance of capacitance circuit 205 as both a bypass capacitor to provide the supply voltage $V_{SUPPLY}$ during normal operation mode of circuit 200 as well as for controlling the slew rate of the supply voltage $V_{SUPPLY}$ across capacitance circuit 205 during power up mode, the total overall amount of silicon area of circuit 200 in the integrated circuit to implement capacitance circuit 205 and slew rate control circuit 207 is reduced if compared to a solution that uses independent capacitances for capacitance circuit 205 for and the slew rate control circuit 207.

Figure 3:
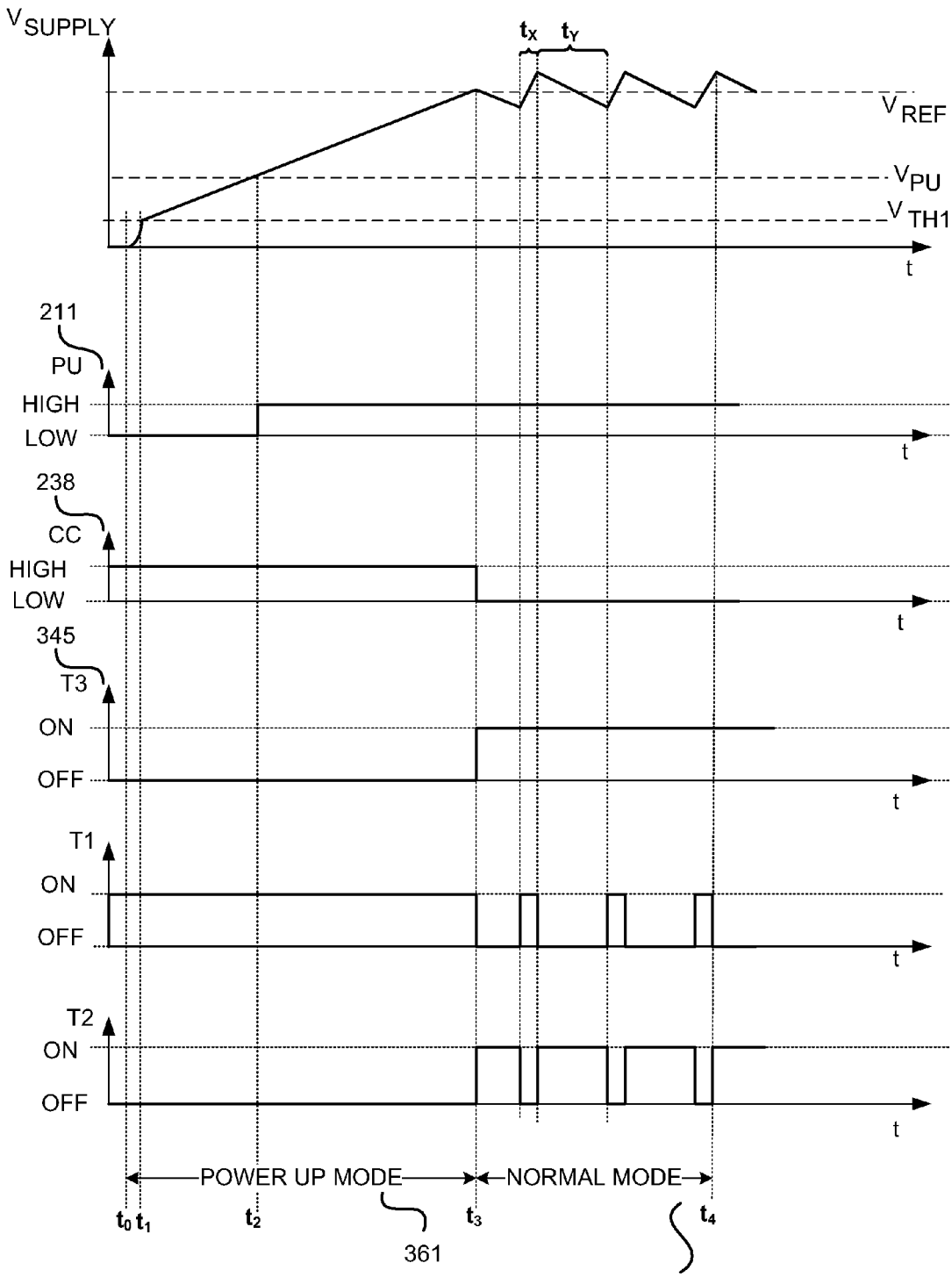
FIG. 3 shows waveforms associated with the example circuit of FIG. 2 in which the slew rate of a voltage across a capacitance being charged during power up is controlled using a portion of the capacitance in accordance with the teachings of the present invention.

FIG. 3 shows waveforms associated with an example circuit in which the slew rate of a capacitance circuit being charged is set using a slew rate control circuit in accordance with the teachings of the present invention.

At time $t_0$, it is assumed that the circuit is beginning to power up in power up mode 361 since supply voltage $V_{SUPPLY}$ does not have any power to operate circuitry in circuit 200. At this point, $V_{SUPPLY}$ starts up at substantially zero volts and power up signal PU 211 is by default set, which indicates power up mode. When supply voltage $V_{SUPPLY}$ reaches a first voltage threshold $V_{TH1}$ at time $t_1$, circuitry (e.g. transistors) in circuit 200 has sufficient voltage to operate. As shown, supply voltage $V_{SUPPLY}$ is not controlled and increases without control until circuitry in circuit 200 has power to operate at time $t_1$. In one example, voltage threshold $V_{TH1}$ may be around 0.8 Volts. When supply voltage $V_{SUPPLY}$ reaches a power up voltage threshold $V_{PU}$ at time $t_2$, power up signal PU 211 goes high to leave latch 237 in FIG. 2 in the "set" condition, which keeps switch T3 switched off. While supply voltage $V_{SUPPLY}$ is below the regulation threshold voltage $V_{REF}$, comparator 225 keeps switch T2 switched off and switch T1 switched on, which allows current source 229 to charge capacitance circuit 205 in a controlled manner. At this point, the slew rate of the supply voltage $V_{SUPPLY}$ is controlled as discussed above with respect to FIG. 2. In one example, slew rate of supply voltage $V_{SUPPLY}$ is controlled from a time $t_1$ to a time $t_3$. The slew rate control current $I_{SC}$ conducted through slew rate control circuit 207 is sensed by the current comparator 259, which outputs the high current comparator output signal CC 238 from a time to $t_0$ a time $t_3$ as shown.

As supply voltage $V_{SUPPLY}$ continues to charge, but before supply voltage $V_{SUPPLY}$ reaches the regulation threshold voltage $V_{REF}$, the power up signal PU 211 becomes high at time $t_2$, which allows the latch 237 to be reset eventually when $V_{SUPPLY}$ reaches the regulation threshold voltage $V_{REF}$ at time $t_3$. In one example, the power up signal PU 211 becomes high after $V_{SUPPLY}$ has risen to about one-third of the regulation threshold voltage $V_{REF}$ of, for example, 5.6 Volts, which indicates that $V_{SUPPLY}$ has risen enough for all the circuitry to be in an active state. In one example, when the power up signal PU 211 is set to high, latch 237 will be ready to receive a reset request from signal CC 238. Switch T3 remains off to keep the slew rate of the supply voltage controlled, as discussed above with respect to FIG. 2.

At a time $t_3$, supply voltage $V_{SUPPLY}$ has risen to the regulation threshold voltage $V_{REF}$ as shown. At this point, power up mode 361 is completed and normal operation mode 363 begins. Since supply voltage $V_{SUPPLY}$ has now reached regulation threshold voltage $V_{REF}$, comparator 225 causes switch T2 to be switched on and switch T1 is switched off at time $t_3$ as shown. With switch T1 switched off due to $V_{SUPPLY}$ reaching the regulation threshold voltage $V_{REF}$, current comparator output signal CC 238 goes low at time $t_3$ as shown. With current comparator output signal CC 238 going low, latch 237 is reset, which causes switch T3 345 to be switched on at time $t_3$ as shown. As a result, capacitor $C_{SC}$ of the capacitance circuit 205 is now connected to ground and the capacitance of capacitor $C_{SC}$ is now no longer utilized by the slew rate control circuit 207 in accordance with the teachings of the present invention.

Between times $t_3$ and $t_4$, FIG. 3 shows that the switches T1 and T2 are switched on and off in the regulator circuit 203 to regulate supply voltage $V_{SUPPLY}$ at the regulation threshold voltage $V_{REF}$. In particular, a time $t_X$ is the charge time of the capacitor circuit, and a time $t_Y$ is the discharge time of the capacitor circuit.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A circuit, comprising:
    a regulator circuit to regulate a supply voltage across a capacitance circuit during a normal operation mode of the circuit;
    the capacitance circuit coupled between a first node and a second node and coupled to the regulator circuit, the regulator circuit coupled to charge a capacitance of the capacitance circuit with a charge current; and
    a slew rate control circuit coupled to the regulator circuit and the capacitance circuit, the slew rate control circuit to set a slew rate of a voltage between the first and second nodes during a power up mode of the circuit, wherein the slew rate control circuit includes a transistor coupled between the first and second nodes to shunt excess current from the charge current to the second node that is not used to charge the capacitance, wherein the slew rate control circuit further includes a switch and a resistor coupled to the capacitance circuit, wherein the slew rate control circuit is coupled to switch the switch in response to a voltage between the first and second nodes, wherein a voltage drop across the resistor is limited to a base-emitter voltage drop of the transistor to set the slew rate.

2. The circuit of claim 1 wherein the capacitance circuit comprises a first electrical element having a first capacitance coupled to a second electrical element having a second capacitance.

3. The circuit of claim 2 wherein a capacitance of the capacitance circuit is equal to the first capacitance during the power up mode and wherein the capacitance of the capacitance circuit is equal to a sum of the first capacitance and the second capacitance during the normal operation mode.

4. The circuit of claim 1 wherein the regulator circuit regulates the supply voltage only during the normal operation mode.

5. The circuit of claim 1 wherein the slew rate control circuit sets the slew rate of the voltage between the first and second nodes only during the power up mode.

6. The circuit of claim 1 wherein the slew rate is the rate of change of the voltage between the first and second nodes.

7. The circuit of claim 2 wherein the first electrical element comprises a first capacitor having a first capacitance and the second electrical element comprises a second capacitor having a second capacitance.

8. The circuit of claim 2 wherein the slew rate control circuit comprises a switch and a resistor coupled to the capacitance circuit, wherein the slew rate control circuit is coupled to switch the switch in response to a voltage between the first and second nodes.

9. The circuit of claim 8 wherein the capacitance of the capacitance circuit is greater during the normal operating mode than the capacitance of the capacitance circuit during the power up mode.

10. The circuit of claim 1 wherein the slew rate control circuit comprises a latch coupled to switch a switch as the circuit changes from power up mode to normal operating mode.

11. The circuit of claim 1 wherein the slew rate control circuit is coupled to utilize a portion of the capacitance from the capacitance circuit during the power up mode.

12. The circuit of claim 11 wherein the slew rate control circuit discontinues utilizing the portion of capacitance from the capacitance circuit in response to the voltage between the first and second nodes reaching a regulation threshold voltage.

13. The circuit of claim 1 wherein a power up signal is coupled to be received by the slew rate control circuit.

14. The circuit of claim 8 wherein the slew rate control circuit further comprises:
   a current comparator coupled to the to sense the charge current from the regulator circuit to detect when the power up mode is complete; and
   a latch coupled to be reset in response to the current comparator to switch the switch on in response to the power up mode being complete.

15. The circuit of claim 1 wherein the regulator circuit comprises a current source coupled to provide the charge current when a voltage between the first and second nodes is less than a regulation threshold value.

16. The circuit of claim 15 wherein the regulator further comprises a comparator coupled to sense when the voltage between the first and second nodes is less than the regulation threshold value, wherein the comparator is coupled to cause the current source to charge the capacitance circuit with the charge current when the voltage between the first and second nodes is less than the regulation threshold value.

* * * * *